US008935515B2

(12) United States Patent
Colavin et al.

(10) Patent No.: US 8,935,515 B2
(45) Date of Patent: Jan. 13, 2015

(54) METHOD AND APPARATUS FOR VECTOR EXECUTION ON A SCALAR MACHINE

(75) Inventors: Osvaldo M. Colavin, San Diego, CA (US); Davide Rizzo, San Diego, CA (US); Vineet Soni, San Diego, CA (US); William L. Schubert, Jr., Oceanside, CA (US)

(73) Assignee: STMicroelectronics, Inc., Coppell, TX (US)

( * ) Notice: Subject to any disclaimer, the term of this patent is extended or adjusted under 35 U.S.C. 154(b) by 0 days.

(21) Appl. No.: 12/544,250

(22) Filed: Aug. 20, 2009

(65) Prior Publication Data

US 2009/0313458 A1 Dec. 17, 2009

Related U.S. Application Data

(62) Division of application No. 11/013,122, filed on Dec. 15, 2004, now Pat. No. 7,594,102.

(51) Int. Cl.
*G06F 9/30* (2006.01)
*G06F 9/45* (2006.01)
*G06F 9/345* (2006.01)
*G06F 9/38* (2006.01)

(52) U.S. Cl.
CPC *G06F 8/45* (2013.01); *G06F 9/345* (2013.01); *G06F 9/381* (2013.01); *G06F 9/3836* (2013.01); *G06F 9/384* (2013.01); *G06F 9/30065* (2013.01); *G06F 9/3013* (2013.01); *G06F 9/30189* (2013.01); *G06F 9/3824* (2013.01); *G06F 9/3867* (2013.01)
USPC .......................................................... 712/229

(58) Field of Classification Search
None
See application file for complete search history.

(56) References Cited

U.S. PATENT DOCUMENTS

| 4,651,274 | A | * | 3/1987 | Omoda et al. | 712/8 |
|---|---|---|---|---|---|
| 4,935,867 | A | * | 6/1990 | Wang et al. | 711/217 |
| 5,197,130 | A | | 3/1993 | Chen et al. | |
| 5,437,043 | A | * | 7/1995 | Fujii et al. | 712/1 |
| 5,537,606 | A | * | 7/1996 | Byrne | 712/7 |
| 6,530,011 | B1 | | 3/2003 | Choquette | |

OTHER PUBLICATIONS

Jouppi et al., "A Unified Vector/Scalar Floating-Point Architecture," Digital, Western Research Laboratory, Research Report 89/8, Jul. 1989, pp. i-v, 1-23.

* cited by examiner

*Primary Examiner* — Andrew Caldwell
*Assistant Examiner* — John Lindlof
(74) *Attorney, Agent, or Firm* — Seed IP Law Group PLLC (57) ABSTRACT

A processor that can execute instructions in either scalar mode or vector mode. In scalar mode, instructions are executed once per fetch. In vector mode, instructions are executed multiple times per fetch. In vector mode, the processor recognizes scalar variables and vector variables. Scalar variables may be assigned a fixed memory location. Vector variables use different physical locations at different iterations of the same instruction. The processor includes circuitry to automatically index addresses of vector variables for each iteration of the same instruction. This circuitry partitions a register into a vector region and a scalar region. Accesses to the vector region are automatically indexed based on the number of iterations of the instruction that have been performed.

16 Claims, 8 Drawing Sheets

METHOD AND APPARATUS FOR VECTOR EXECUTION ON A SCALAR MACHINE

BACKGROUND OF INVENTION

1. Field of Invention

This invention relates generally to processors and more specifically to processor architectures.

2. Discussion of Related Art

Processors are well known and widely used in many applications. High end processors are used in supercomputers and other computation intensive applications. Some such processors employ vector architectures. A vector architecture allows the processor to fetch an instruction once and then execute it multiple times with different data. In applications where a significant time is spent in vectorizable loops, the energy required to execute a program can be reduced because, among other factors, each instruction needs to be fetched fewer times per loop. Vector architectures have been generally limited to high end processors because they require significant space on a semiconductor die on which the processor may be implemented.

Even relatively small electronic devices, such as hand held electronic devices, employ processors. Processors used in small electronic devices tend to have a scalar architecture. A processor with a scalar architecture fetches the instruction and data for the instruction each time the instruction is executed. In executing a loop that requires an instruction be executed multiple times, a processor with a scalar architecture will fetch the instruction multiple times. Processors with scalar architectures tend to execute programs more slowly then those with vector architectures. However, they tend to occupy a smaller area on a silicon die, which can be a significant advantage in making a small or low cost processor for an embedded application.

Some scalar processors have been adapted to execute multiple operations for one fetch of an instruction. Such architectures proved difficult in practice to use. The instruction set for the processor needed to be expanded to accommodate many new instructions encoding multiple operations. In addition, making a complier that could identify patterns of instructions in a program that could be mapped to an instruction encoding multiple operations proved difficult.

A related concept is called "software pipelining." Software pipelining is a technique used in processors that may simultaneously process multiple instructions to implement a "software pipeline," the order of instructions processed is selected to reduce the total execution time of a block of code.

Some processors employ a "rotating register file." A rotating register file provides a series of register locations that can be readily accessed by a processor. Successive reads or writes to the same address in the register file can result in accesses to successive locations in the file. When the last location is reached, the succession "rotates" back to the first location. Rotating register files have not heretofore been used in connection with executing vector instructions in the manner described below.

It would be desirable to provide an improved processor architecture.

SUMMARY OF INVENTION

In one aspect, the invention relates to a method of operating a processor to fetch and execute a plurality of instructions. The method comprises operating the processor in a first mode to execute a first subset of instructions in the plurality of instructions, with each instruction in the first subset executed no more than one time each time the instruction is fetched. The processor is operated in a second mode to execute a second subset of instructions in the plurality of instructions, with each instruction in the second subset executed a plurality of times each time the instruction is fetched.

In another aspect, the invention relates to a method of operating a processor to execute a sequence of instructions. The method comprises executing instructions in a first mode that includes fetching a first instruction; fetching an operand for the first instruction; executing the first instruction with the operand; fetching a second instruction before subsequently executing the first instruction. Instructions are executed in a second mode that includes: fetching a third instruction; fetching an operand for the third instruction; executing the third instruction with the fetched operand; fetching a second operand for the third instruction; and executing the third instruction with the second operand before executing another instruction.

In another aspect, the invention relates to a processor comprising an instruction decode circuit having an address output. A rename circuit has an address input coupled to the address output of the instruction decode circuit and an address output. The rename circuit includes a counter; an arithmetic circuit having a first input coupled to the address input and a second input coupled to the counter and a renamed output, the arithmetic circuit configured to provide at the renamed output a value representing a value at the first input offset by an amount proportional to a value at the second input; a switching circuit having a first input coupled to the address input, a second input coupled to the renamed output of the arithmetic circuit, a control input and an output coupled to the address output of the rename circuit, the switching circuit configured to couple a value at the first input of the switching circuit or a value at the second input of the switching circuit to the output selectively in response to a value of the control input. The processor also includes a data access circuit, having an address input coupled to the address output of the rename circuit.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

In an embodiment of the invention, a scalar processor is adapted to execute vector instructions. The additional circuitry required to adapt a scalar processor for vector execution can be made relatively small. As a result, the processor may be used in embedded applications where small size, low power and/or low cost is desired.

Figure 1A:
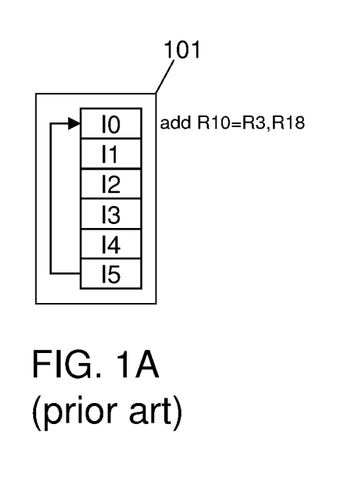
FIG. 1A is sketch illustrating a block of code such as may exist in a program executed in a processor.

FIG. 1A illustrates a block 101 of code that implements a loop. The loop contains six instructions, identified as I-0 through I-5. Instruction I-5 may be a conditional branch instruction, causing execution to return to the start of the loop when certain conditions are met. In the described embodiment, the condition relates to the number of iterations through block 101 of code that have been executed so that the loop is executed a fixed number of times. In the example illustrated by FIGS. 1B and 1C, the loop is executed four times.

Figure 1B:
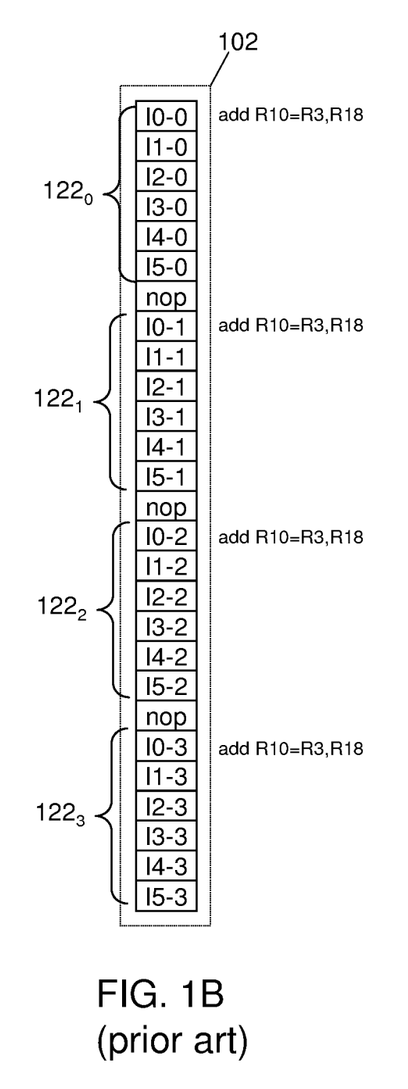
FIG. 1B is a sketch illustrating the order of execution of instructions in a prior art scalar processor executing the block of code illustrated in FIG. 1A.

FIG. 1B shows a trace 102 of instruction execution such as may occur in a prior art scalar processor executing block 101 of code. Trace 102 contains iterations $122_0$, $122_1$, $122_2$ and $122_3$, indicating that block 101 of code is executed successively four times.

The "NOP" between iterations of the loop indicates that no operation is performed for one cycle between successive iterations of the loop. The NOP is the result of pipelined hardware in the processor executing block 101 of code. In a pipelined architecture, one instruction is "pre-fetched" while the prior instruction is being executed. Instructions are fetched sequentially from instruction memory so that the pre-fetched instruction is the instruction stored at the address in instruction memory following the instruction being processed. If an instruction causes a branch when executed, the instruction to be executed is not the pre-fetched instruction. Therefore, the processor has no instruction to execute in the cycle following the branch and performs no operation while the required instruction is fetched.

Figure 1C:
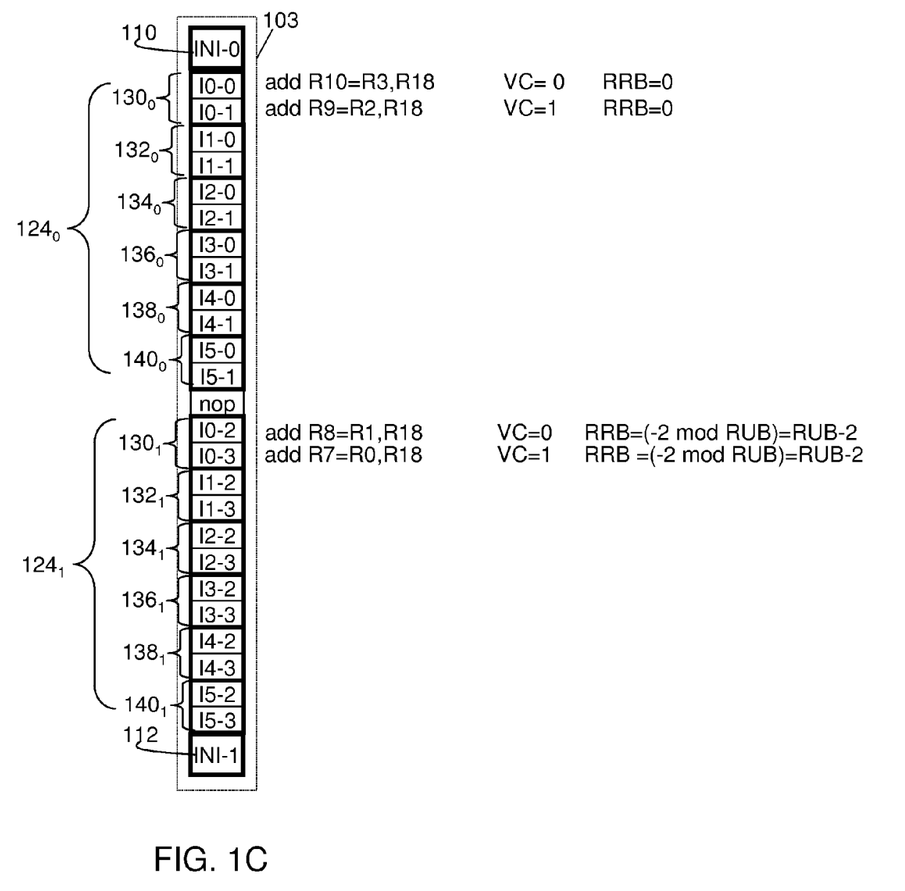
FIG. 1C is a sketch illustrating the order of execution of instructions in a processor according to one embodiment of the invention executing the block of code illustrated in FIG. 1A.

FIG. 1C shows a trace 103 for block 101 of code executed on a processor modified to execute vector instructions according to one embodiment of the invention. As shown in this embodiment, each instruction may be executed multiple times successively before the next instruction is executed. The number of times each instruction is executed in succession is here referred to as the vector length. Trace 103 reflects a vector length of 2.

The four iterations through the loop in block 101 of code are represented as two vector iterations $124_0$ and $124_1$, each having vector runs corresponding to multiple, successive iterations of the same instruction in block 101 of code. Vector iteration $124_0$ includes vector runs $130_0$, $132_0$, $134_0$, $136_0$, $138_0$, and $140_0$. Vector iteration $124_1$ includes vector runs $130_1$, $132_1$, $134_1$, $136_1$, $138_1$, and $140_1$.

Trace 103 represents a trace where the number of loop iterations is an integer multiple of the vector length. In situations where the loop is executed a number of times that is not a multiple of the vector length, code may be generated to cause execution of the loop the appropriate number of times by using a mix of vector mode and scalar mode execution. For example, the loop could be executed a number of times in vector mode to produce the largest number of iterations that is less than or equal to the number of iterations required for the loop. The remaining iterations could be executed in scalar mode either before or after the vector iterations. In the examples that follow, loops are shown being executed a number of times that is an integer multiple of the vector length. Additional iterations performed in scalar mode are not shown. Accordingly, such examples should not be regarded as limiting use of the invention to loops that can be expressed as an integer number of vector iterations.

To yield the same result whether a block of code is executed in vector mode or scalar mode, operation in vector mode requires that each iteration of an instruction access the appropriate operands and store its result where it can be appropriately accessed. The operands and results are here referred to generally as "variables."

The values of some variables used in the execution of an instruction may change each time the instruction is executed. For example, in a loop that sums a string of values, an instruction within the loop that performs an addition operation may receive a different value in the string each time the instruction is executed. When such an instruction is executed multiple times in succession, the variable representing the operand at each successive execution must be stored in a separate storage location. If an attempt were made to store all the values in the list in one storage location, later values written to that location could overwrite earlier values before the earlier values were used. In this example, using the same storage location for operands for successive executions of the instruction in vector mode would result in adding multiple times the last value written to the storage rather than summing multiple different values.

In contrast, other variables may use the same storage location for all executions of the instruction during the loop. In the example of a loop that sums a string of values, the result of the instruction that performs the addition operation may be written to the same storage location each time the instruction is executed. Each value may overwrite the value in that location, but because the old value is not used once the new value is generated, no information is lost by using the same location for all executions of the instruction.

A variable that may be stored in the same memory location for every execution of an instruction in vector mode is termed a "scalar variable." In contrast, a variable that needs to have separate storage locations allocated for different executions of an instruction to ensure that the appropriate data is available for each execution of the instruction is referred to as a "vector variable."

A processor according to the invention may provide a means to allow different storage locations to be used to store the value of a vector variable for different executions of the same instruction. In the described embodiment, the correct storage location for a vector variable is automatically accessed for each execution of an instruction accessing that vector variable.

In the described embodiment, variables are stored in a register file. The register file is divided into two portions. One portion stores "scalar variables." The other portion stores "vector variables."

The compiler generating a program for the processor assigns a register to store the value of each variable, based on the desired properties of that variable. Scalar variables are assigned a register in the scalar portion of the register file and vector variables are assigned a register in the vector portion of the register file. An access to a register in the vector portion of the register file is "renamed" for each iteration of an instruction accessing that register. Renaming the register means that the storage location accessed when that register is used changes for each execution of the instruction. In this way, the desired effect of providing a different storage location for the variable each time an instruction is executed may be achieved.

FIGS. 1A . . . 1C show an example of register renaming that may occur automatically when the processor is operating in vector mode. Instruction I0 causes the addition of two values. In the illustration of FIG. 1A, instruction I0 appearing in block 101 of code (FIG. 1A) is coded to store in register R10 the sum of the values in registers R3 and R18.

In trace 102 representing the loop executed in scalar mode, each execution of instruction I0 uses the same registers for executing the instruction. The result of each execution of the instruction I0 is stored in register R10. The operands are always read from registers R3 and R18.

In the example of FIG. 1C, registers R3 and R10 are treated as vector variables. For each execution of an instruction within a vector, the actual register accessed is determined by indexing the register address for each time the instruction has been executed. Thus, instruction I0 that specifies a write to register R10 writes to register R10 during the first iteration of instruction I0, here denoted I0-0. In the next execution of that instruction, all references to R10 may be automatically "renamed" to the next lowest register address. Here, execution I0-1 of instruction I0 its results in register R9.

A similar pattern may be used to access other registers. Instruction I0 refers to a register R3. In execution I0-0, the operand for the instruction is read from register R3. In execution I0-1, the register address of the operand may be automatically indexed to read the value from register R2. In this way, different executions of the instruction may receive different data. Other instructions that provide the data for instruction I0 may also index registers in the same way to ensure that the data used by each iteration of instruction I0 is stored in the appropriate registers.

In contrast, register R18 holds a value that does not require a separate storage location for each iteration of instruction I0. Register R18 is in the scalar portion of the register file and is therefore not renamed for each iteration of instruction I0.

A processor exhibiting the desired "vector mode" operation may be implemented as a modified scalar processor. The processor may be constructed to repeat instructions when it is placed in vector mode. When executing instructions in vector mode, each instruction is repeated a number of times specified by a "vector length."

In the described embodiment, the processor responds to an initialization instruction indicating that the processor is to enter vector mode. This instruction specifies the vector length. It may also include information identifying which registers are in the vector portion of the register files or to otherwise set the processor in the required state for executing instructions in vector mode. For example, instruction 110 shown in FIG. 1C may set the processor in vector mode.

In the described embodiment, an instruction is also used to end vector mode and return the processor to scalar mode. A separate instruction may be used to place the processor in a scalar mode. In trace 103, instruction 112 places the processor in scalar mode.

Figure 2A:
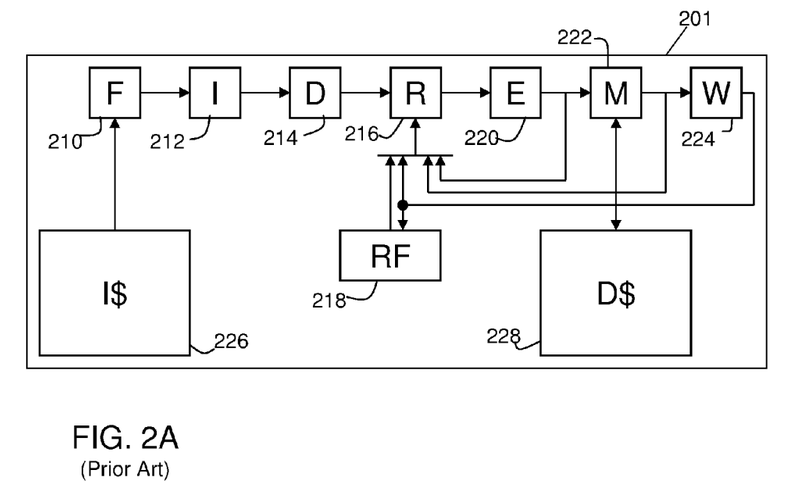
FIG. 2A is a block diagram of a processor according to the prior art.

FIG. 2A is an example of a scalar processor 201 as known in the art. Scalar processor 201 operates only in scalar mode, executing each instruction no more than once for each fetch of the instruction.

Processor 201 includes an instruction cache 226. Instructions to be executed by processor 201 are obtained from cache 226. Cache 226 may store only a portion of all instructions in a program to be executed by processor 201. Cache 226 may be connected to a larger instruction memory or memories to hold the remainder of the instructions in a program. A "cache miss" occurs if an instruction is not stored in cache 226 when needed by processor 201. Cache 226 may contain interface circuitry to move instructions from the larger memories into cache 226 to reduce the chances of a cache miss. The interface circuitry may also fetch an instruction from the larger memory or memories if a cache miss occurs.

Processor 201 is a pipelined processor. In the illustrated embodiment, it contains seven pipeline stages. Fetch stage 210 is the first stage of the pipeline. It is connected to cache 226. It fetches instructions from sequential memory addresses unless a branch or other flow altering instruction is executed. Upon execution of a branch or flow altering instruction that specifies a non-sequential address, fetch stage 210 fetches the instruction at the specified address and then begins fetching instructions sequentially from that point.

Issue stage 212 is the next stage in the pipeline. Issue stage 212 determines which instruction is passed to subsequent stages for execution. Instruction branching may be implemented at the issue stage. Upon execution of a branch instruction, issue stage 212 may issue a NOP instruction while indicating to fetch stage 210 the address of the next instruction to be fetched.

Decode stage 214 is the next stage in the pipeline. Each instruction may include one or more fields that specify operations to be performed by other components in processor 201. Decode stage 214 converts the values in these fields to control signals appropriate for each component of the processor. Some portion of the outputs of decode stage 214 specify registers to be accessed when the instruction is executed.

Read stage 216 is the next stage in the pipeline. Read stage 216 reads from register file 218 values used as operands of the instruction. The specific locations in register file 218 read are indicated by outputs of the decode stage. Register file 218 may be a memory structure that includes multiple memory locations, each that can be accessed by a register address.

Execute stage 220 is the next stage in the pipeline. Execute stage 220 executes the instruction by sending control signals and data to the other components of the processor.

Memory stage 222 is the next stage in the pipeline. Memory stage 222 writes or reads values to or from data cache 228. Data cache 228 may be constructed similarly to instruction cache 226, storing data values for quick access by memory stage 222. Data cache 228 may also interface to one or more larger memories in which it can read or write more information than can be stored in the cache.

Write back stage 224 is the final stage in the pipeline. In write back stage 224, results of executing an instruction may be written into register file 218 so that they are available for use in executing a subsequent instruction. Alternatively, the results may be passed back directly to the read stage for use at that time.

FIG. 2A does not expressly show all details of a processor 201, though one of skill in the art will understand that other components may be present to enable processor 201 to perform the desired operations. For example, FIG. 2A does not show power and ground connections or all of the interconnections required to provide control and data signals to each portion of the processor. FIG. 2A also does not expressly show clock circuitry that produces clock signals that define pipeline cycles during which each stage performs an operation.

Pipeline control circuitry is also not expressly shown. Each stage in the pipeline produces an output that is passed to the next stage in the pipeline. The output is latched until it is read by the next stage in the pipeline. Each stage may produce an output at each cycle of pipeline operation. When executing some instructions or under some operating conditions some stages may not produce an output each cycle. Accordingly, there may be status or control signals passed from one stage to the next to allow each stage to know when to use, or not use, the value latched at the output of the prior stage. Also, there can be conditions under which a stage is not able to read the value from a prior stage in the same cycle that it is available. In this scenario, a control mechanism may be provided to preclude the prior stage from generating a new output value that would overwrite a prior output value until it is used in the subsequent stage. Such control circuitry is said to "stall" stages in the pipeline, meaning that a stage does not provide a new output value during one or more pipeline cycles.

Pipeline synchronization circuitry may also be present, but is not expressly shown. Each stage may generate data or command values used at other stages to process certain instructions. Those data or command values are used in another stage when the instruction to which they relate is processed by that stage. Because the pipeline creates time differences between when each stage operates on a specific instruction, synchronization circuitry may be required to match the control or data associated with an instruction at one stage with that instruction when processed at another stage.

Figure 2B:
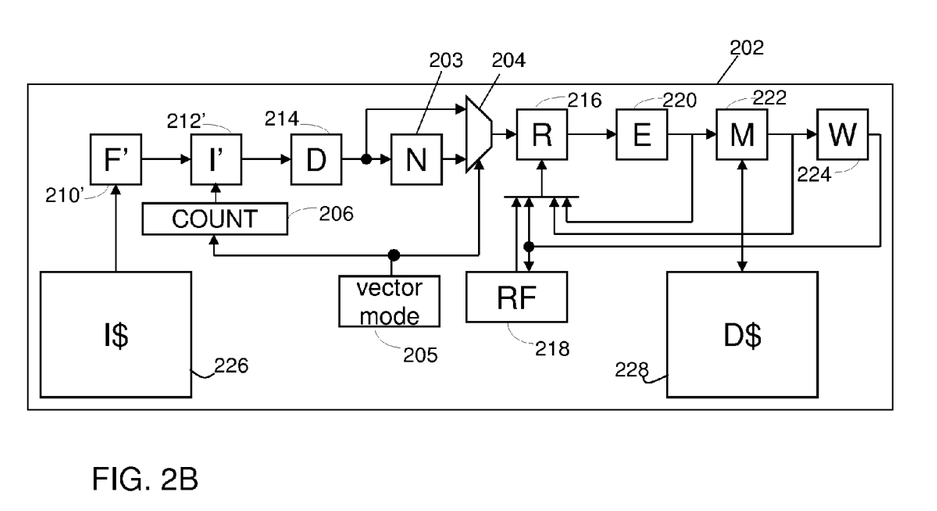
FIG. 2B is a block diagram of a processor according to an embodiment of the invention.

Turning now to FIG. 2B, a modified pipelined processor 202 that can support execution of instructions in vector mode and scalar mode is shown. Processor 202 may include components that are similar or identical to those in a prior art processor 201. In this embodiment, processor 202 includes decode stage 214, read stage 216, memory stage 222 and write back stage 224 that are the same as in prior art processor 201.

Data cache 228 and instruction cache 226 may also be the same as or similar to the instruction cache and register file in prior art processor 201. However, these memory structures may store different information than in prior art processors.

Similarly register file 218 in processor 202 may have a physical structure that is the same as or similar to the structure of register file in prior art processor 201. However, the information stored in register file 218 in processor 202 may be organized differently than the information in register file 218 in prior art processor 201 to accommodate ready access of data in either scalar or vector mode.

Execute stage 220 may also be similar to the execute stage in prior art processor 201. If the instruction set for processor 202 contains instructions for vector mode operation, execute stage 220 may be adapted to execute these instructions.

Fetch stage 210' in processor 202 is similar to fetch stage 210 in processor 201. Fetch stage 210', like fetch stage 210, fetches instructions from instruction cache 226. However, fetch stage 210' may be modified to allow for operation in vector mode. In vector mode, instructions are fetched at a lower rate than in scalar mode. Logic within fetch stage 210' may be modified to accommodate different rates of fetching instructions.

Fetch stage 210' may be constructed to fetch the next instruction when issue stage 212' issues the first iteration of an instruction in a vector run. Once the next instruction is fetched, fetch stage 210' may be stalled until issue stage 212' requests the next instruction.

Issue stage 212' may also be similar to issue stage 212 in prior art processor 201. However, issue stage 212' may be modified to issue the same instruction multiple times when operating in vector mode. In vector mode, each instruction may be issued a number of times equal to the vector length. Here, counter 206 is shown coupled to issue stage 212'. Counter 206 represents hardware that allows issue stage 212' to track the number of iterations of each instruction in order to implement vector runs. Counter 206 may have no effect on the operation of processor 202 in scalar mode. In vector mode, counter 206 may be loaded with a value representing the vector length each time a new instruction is received in issue stage 212'. The counter may be decremented each time the same instruction is issued. When counter 206 counts down to zero, issue stage 212' may request a new instruction from fetch stage 212'.

Counter 206 represents schematically that issue stage 212' issues instructions multiple times in vector mode. Such a counter need not be physically present. Any suitable method may be used to control issue stage 212' to issue each instruction multiple times, including accessing counters in other stages.

Further, issue stage 212' may be constructed to recognized instructions that change the operating mode of processor 202. In this way, issue stage may, beginning with the next instruction, issue that instruction the appropriate number of times. Upon recognizing an instruction to place the processor in vector mode, issue stage 212 may also initialize the other stages in the pipeline to operate in the required mode.

The instruction issued at issue stage 212' is passed to decode stage 214. Decode stage 214 outputs the instruction being executed in decoded form. Some portion of the decoded instruction will specify addresses of registers that are to be used in executing the instruction. The register address output by decode stage 214 represents the register address encoded in the instruction as written in block 101 of code (FIG. 1A). This address may not be the actual address used in vector mode, which may be providing rename stage 203.

Processor 202 may include a rename stage 203. Rename stage 203 provides for indexing of register addresses used to store vector variables in vector mode. In scalar mode, rename stage 203 is not required. Accordingly, processor 202 includes a multiplexer 204 that allows rename stage 203 to be bypassed. In vector mode, the output of rename stage 203 is coupled to read stage 216. Conversely, in scalar mode multiplexer 204 is operated to bypass rename stage 203.

The control input to multiplexer 204 is derived from vector mode indicator 205, which has a value indicating the operating mode of processor 202. It is shown in more detail in FIG. 4 below. Other components of processor 202 that operate differently in vector and scalar mode may receive a control signal from vector mode indicator 205.

Read stage 216 may receive register addresses that have been renamed at rename stage 203. Read stage 216 need not perform differently while in vector mode. It may, in both scalar and vector mode, read the data value stored in register file 218 at the address provided to it.

Similarly, execute stage 220 performs the same in scalar and vector mode. Execute stage 220 generates the control signals required to cause execution of the instructions applied to it. Likewise, memory stage 222 and write back stage 224 perform similarly to the corresponding stages in prior art processor 201.

Figure 3A:
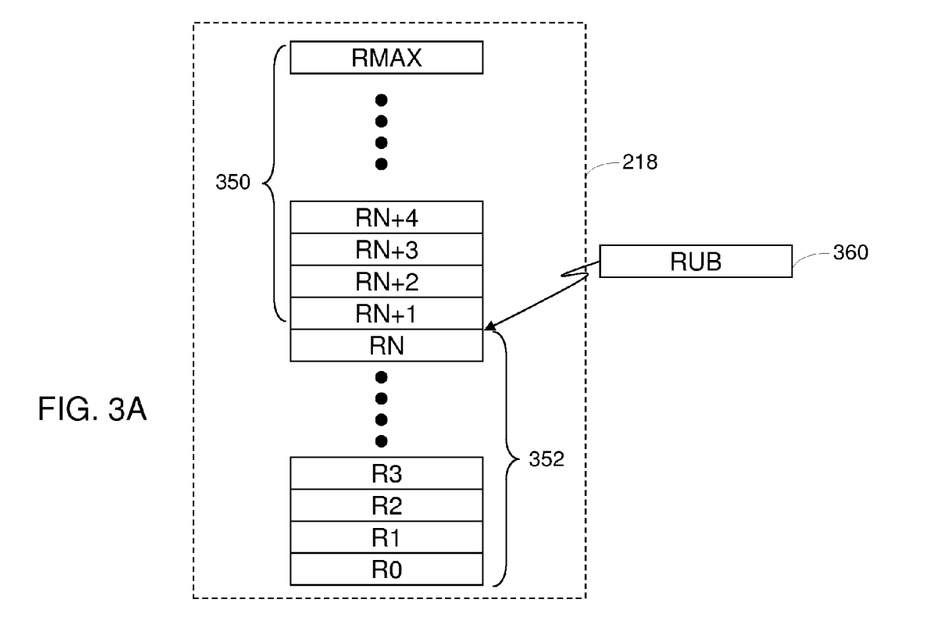
FIG. 3A is a block diagram illustrating a register file.

Turning to FIG. 3A, a schematic illustration of register file 218 is shown. Register file 218 contains multiple storage locations which are here designated as R0 . . . RMAX. In scalar mode, these register locations may be used as in a traditional scalar processor. In vector mode, the locations within register file 218 are divided into two portions, a scalar portion 350 and a vector portion 352. Scalar variables may be stored in scalar portion 350. Vector variables may be stored in vector portion 352.

The partitioning of register file 218 may be created in any convenient way. In the illustrated embodiment, a register 360 is loaded with a value denoted RUB that serves as a pointer to one of the register locations in register file 218. This pointer identifies the highest register address of the first register in scalar portion 350. The value RUB also identifies the number of registers in the vector portion. In this implementation, vector portion 352 includes the registers with lower addresses.

Figure 3B:
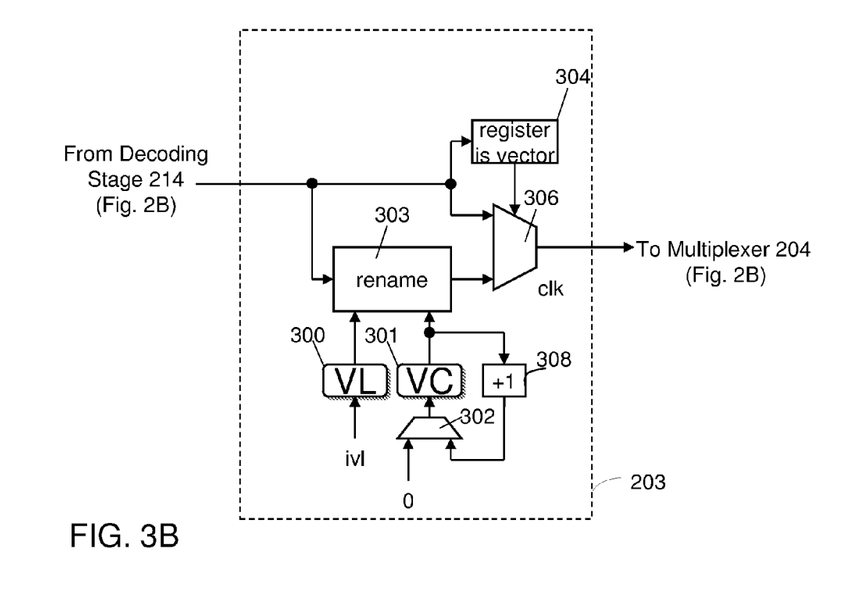
FIG. 3B is a block diagram of a circuit that may be used to implement the rename stage of the processor of FIG. 2B.

FIG. 3B shows rename stage 203 in greater detail. Rename stage 203 receives an input from decoding stage 214 (FIG. 2B). This input is the address of a register as encoded in an instruction to be executed. The output of rename stage 203 is provided to multiplexer 204 as shown in FIG. 2B. This output represents the address of the register actually accessed. Rename stage 203 generates the output by appropriately indexing the input address. If the input address refers to a register in scalar portion 350, no indexing is required. Accordingly, rename stage 203 includes a multiplexer 306 that may be configured to pass the input register address to the output register address without performing any indexing.

Here, multiplexer 306 is shown to receive its control input from logic 304 that determines whether the input register address refers to a register in scalar portion 350 or vector portion 352. When logic 304 determines that the input register address refers to a register within scalar portion 350, multiplexer 306 is controlled to pass the input register address to the output without indexing. Conversely, when logic 304 determines that the input register address refers to a register within the vector portion 352, multiplexer 306 is configured to switch to its output the register address computed in rename logic 303. Logic 304 is shown in greater detail in connection with FIG. 4, below.

For register addresses referring to registers that hold vector variables, rename logic 303 computes a new register address that is appropriately indexed. The addresses are indexed to reflect the specific execution of the instruction within a vector run and also the specific vector iteration. For example, FIG. 1C shows instruction I0-0, which is the first execution of instruction I0. It is the first instruction in the first vector run $130_0$, which is in the first vector iteration $124_0$. Instruction I0-0 stores its result in register R10 and uses the value in register R3 as an operand. Instruction I0-1, which is the second execution of the instruction in first vector run $130_0$, uses registers that are indexed by one address. Specifically, R10 is indexed to R9. R3 is indexed to R2. The pattern continues with instruction I0-2. This instruction is the first execution in vector run $130_1$, which is in the second vector iteration $124_1$, but is the third iteration of instruction I0 while the loop contained within block 101 is executed in vector mode. Accordingly, the address of the registers have been indexed by two. The next iteration of the instruction I0 is the second iteration in vector run $130_1$, but the fourth iteration of the instruction in vector mode. Accordingly, the addresses for the registers holding vector variables are indexed by three. This pattern indicates that the appropriate index value depends both on the position of an instruction within a vector run and the vector iteration in which that vector run falls.

In the disclosed embodiment, multiple registers are used to track the parameters needed to generate the required index values. Two state registers are shown connected to rename logic 303 to provide values needed to compute new register addresses properly indexed. Register 300 stores a value denoted VL. Here, VL represents the length of the vector run being executed by processor 202. In the described embodiment, the value VL is encoded as an argument in instruction 110 that places process 202 in vector mode. In this way, the value of VL may be loaded into register 300 when instruction 110 is executed. In embodiments where processor 202 executes vectors of a fixed length, the value of VL may be hard wired into rename logic 303. However, any suitable method of specifying a value of VL may be used.

Rename logic also receives a value, denoted VC, from register 301. Register 301 acts as a counter to track the number of iterations of an instruction that have been executed within a vector run. Register 301 is loaded with a new value each time an instruction is processed at rename stage 203.

Register 301 is loaded with a value derived from multiplexer 302. One switched input of multiplexer 302 is shown hardwired to a value of zero. In operation, multiplexer 302 is controlled to switch this input through to its output each time rename stage 203 processes a register address from the first instruction in a vector run. Such a control signal may, for example, be propagated from issue stage 212'. In this way, register 301 is loaded with a value of 0 at the start of each vector run.

For any instruction in a vector run except the first, multiplexer 302 is controlled to switch the output of adder 308 to the input of register 301. The input of adder 308 is connected to the output of register 301, reflecting a current value of VC. In the pictured embodiment, adder 308 is hardwired to add a fixed value to the current value in register 301. In this way, the value VC in register 301 is a counter tracking the number of executions of an instruction in a vector run. Here, the value in register 301 increases by one for each execution, but any suitable value may be used.

Figure 4:
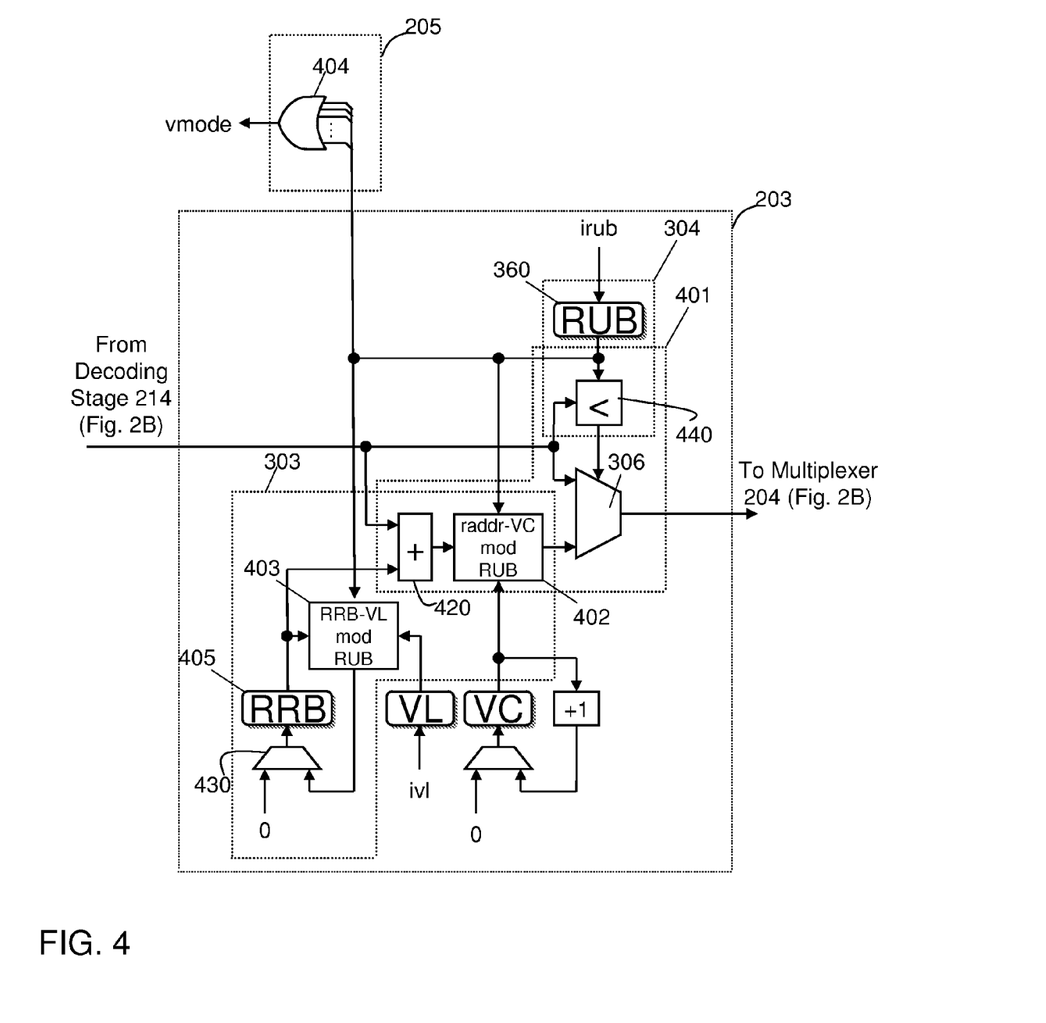
FIG. 4 is a block diagram of the rename circuitry of FIG. 3B shown in greater detail.

Turning now to FIG. 4, additional details of rename logic 303 and logic 304 are shown. Rename logic 303 includes subtractor 402. Subtractor 402 is a modulo subtractor with a modulus equal to the value RUB stored in register 360. Modulo subtractor 402 produces a value between 0 and RUB-1, ensuring that any address computed points to a register within vector portion 352 of register file 218.

One operand to subtractor 402 comes from adder 420. A second operand to subtractor 402 comes from register 301, representing the vector count, VC. This value is subtracted from the value from adder 420. As the value of VC increases, the output of subtractor 402 decreases, thereby indexing the register address to decrease for each iteration of an instruction within a vector run.

Because the value in register 301 is, in the disclosed embodiment, reset to zero at the start of each vector run, additional circuitry is used to ensure that the pattern of indexing continues if a loop is executed with multiple vector iterations. At the start of each vector iteration, a value denoted RRB is determined. The amount that each register address is indexed is adjusted by the value of RRB.

In the embodiment of FIG. 4, RRB is stored in register 405. Register 405 is loaded, at the start of each vector iteration, with a value from multiplexer 430.

Multiplexer 430 has one of its switched inputs hardwired to a fixed value, which is here shown as zero. However, the specific value used is not critical. At the start of the first vector iteration of a loop, multiplexer 430 couples this input to register 405. In this way, the value RRB in register 405 is set to zero at the start of the execution of a loop in vector mode. In one embodiment, the start of a loop is indicated by the execution of initialization instruction 110. In this embodiment, each loop executed in vector mode is preceded by the initialization instruction 110. However, any suitable method for determining the start of a loop in vector mode may be employed.

At the start of each vector iteration after the first, register 405 loads a value from multiplexer 430 that is derived from the other switched input of multiplexer 430. Here, the other switched input is the output of subtractor 403.

Subtractor 403 is a modulo subtractor, operating modulo RUB. It outputs a result that is the current value of RRB, as stored in register 405, decreased by the vector length stored in register 300.

The output of subtractor 403 may be taken as a negative value. When the output of subtractor 403 is added in adder 420 to the register address, the result is the input register address from decoding stage 214 reduced by the vector length for each vector iteration that has been completed. When the value VC is then subtracted in subtractor 402 from the value output by adder 420, the result is a register address that is indexed by an amount based on the number of executions that have been performed of the instruction that is being processed.

FIG. 4 also shows details of logic 304 that determines whether a register address encoded in an instruction is used to store a vector variable. As described above in connection with FIG. 3A, scalar variables are stored in registers in scalar portion 350. Vector variables are stored in registers in vector portion 352. All registers in vector portion 352 have an address that is smaller than the value of RUB stored in register 360. In the described embodiment, vector variables are identified by comparing the address for the register holding that variable to the value of RUB. This comparison is made within logic 304.

Logic 304 includes comparator 440. Comparator 440 receives as inputs the values representing the register address from decoding stage 214. A second input to comparator 440 is connector to register 360, which stores the value of RUB. Logic 304 produces an output indicating the register is used to store a vector variable when comparator 440 indicates that the register has an address that is less than RUB.

FIG. 4 also shows details of a possible implementation of mode indicator 205. In the pictured embodiment, register file 218 is segmented into a scalar portion and a vector portion based on the value RUB. When processor 202 is not in vector mode, the value of RUB in register 360 may be set to zero, indicating that there is no vector portion. Thus, the mode of operation of processor 202 can be determined by determining whether the value in register 360 is zero or non-zero. One example of a circuit that can determine whether the value in register 360 is non-zero is OR gate 404. OR gate 404 receives as its inputs all of the bit values in register 360. If all of the bits in register 360 have a value of zero, the output of OR gate 404, and therefore the output of mode indicator 205, is zero. Conversely, if RUB has been set to any non-zero value, mode indicator 205 will indicate that processor 202 is operating in vector mode.

To ensure that a non-zero value of RUB is stored in register 360 in vector mode and a zero value of RUB is stored in scalar mode, instructions 110 and 112 that place processor 202 in vector mode and remove it from vector mode, respectively, may both contain a field in which the value of RUB is set.

FIG. 2B, FIG. 3B and FIG. 4 show a single rename stage 203. For instructions that specify more than one register, this stage may sequentially process the register addresses of all registers associated with an instruction. However, in one embodiment, there are multiple copies of logic block 401, one for each possible register that may be addressed by an instruction. In the example of FIG. 1C, instructions use as many as three registers: two specifying registers from which operands are to be read and one specifying a register to which a result is to be written. In a processor with this configuration, there may be three copies of logic block 401 connected in parallel.

Figure 5:
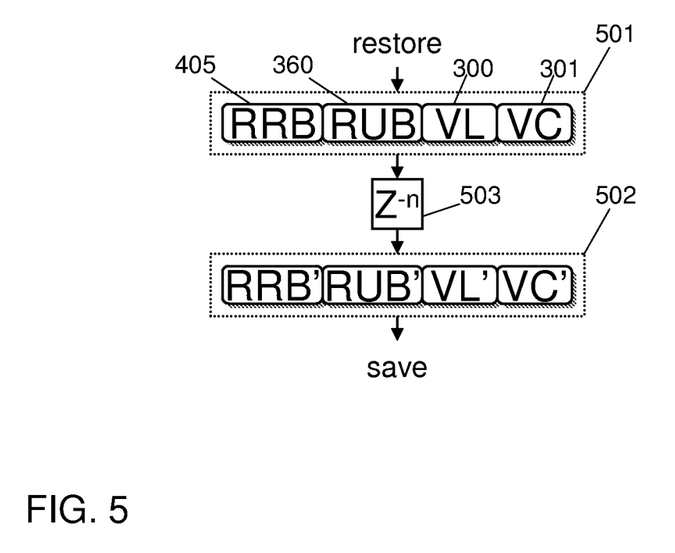
FIG. 5 is a sketch illustrating hardware that may be incorporated in the processor of FIG. 2B to avoid a hazard that can result from a context switch while the processor is in vector execution mode.

Turning now to FIG. 5, an additional detail of processor 202 is shown. FIG. 5 shows that values defining the architectural state of rename stage 203 are stored in a word 501. The specific implementation of the data structure is not critical to the invention. Word 501 may be stored in a register, with registers 300, 301, 360 and 405 being implemented as fields within this register. Alternatively, registers 300, 301, 360 and 405 each may be implemented as a separate register, with word 501 representing a logical construct that indicates that all of these registers are manipulated as a group.

The structure of FIG. 5 may be included to facilitate correct execution of precise exceptions or other context switches. In a processor, a context switch stops the execution of a program at some instruction. The processor will then perform other tasks. Often, the processor will finish the other tasks and return to executing the program that was interrupted by the context switch. Usually, it is desired for the program to resume where it left off. Upon a context switch, information needed to resume execution at the appropriate point in the program is stored.

Because there are actually multiple instructions in the pipeline—each stage in the pipeline may be processing a different instruction—it is necessary to define which instruction will be the first executed upon return from the context switch. Knowing which instruction is to be first executed defines the information that must be stored upon a context switch and restored upon return from the context switch.

In many processors, the instruction that is being processed in the stage that immediately precedes the write-back stage is the first instruction executed upon return from a context switch. In the embodiment of FIG. 2, memory stage 222 immediately precedes write back stage 224. Thus, upon a precise exception, or other context switch, information needed to begin processing of instructions with this instruction must be stored.

In the embodiment of FIG. 2B, the memory stage 222 is three pipeline stages after rename stage 203. As a result, the instruction reaches memory stage 222 three pipeline cycles after it was processed in rename stage 203. The values that were in word 501 defining the architectural state of rename stage 203 when that instruction was processed in rename stage 203 may have been changed in those three pipeline cycles. As a result, if the architectural state of rename stage 203 is saved upon an exception or context switch, the saved state of rename stage 203 may not be the state required for proper execution of the first instruction to be executed upon return from a context switch.

To avoid improper operation, FIG. 5 shows a second word 502 that is a delayed copy of word 501. Words 501 and 502 are shown separated by a delay chain 503. Delay chain 503 has a delay, expressed in pipeline cycles, that equals the delay between rename stage 203 and memory stage 222. As a result of this delay, register 502 stores the architectural state of rename stage 203 when the instruction in memory stage 222 was executed in rename stage 203.

Thus, when execution is to resume after a context switch with the instruction that was in memory stage 222, it is the architectural state in word 502 that needs to be restored to rename stage 203. Word 502 is stored upon a context switch and then used to restore values in the state registers of rename stage 203 upon a return from a context switch.

As described above, processor 202 may execute programs generally using the same instruction set as a prior art processor. However, some modifications of the instruction set may be desired. An additional instruction may be included to set the operating mode of the processor into scalar mode or into vector mode. This instruction sets the values of parameters used in vector mode, such as those illustrated in word 501. Execution of such an instruction may specify values of vector length stored in register 300 and RUB stored in register 360. Execution of such an instruction may also reset the value of RRB stored in register 405 and of VC stored in register 301.

It may also be desirable to either define a new branch instruction that is used for branches executed in vector mode or configure processor 202 to process branch instructions differently in vector mode. In the described embodiment, a vector run of branch instructions is processed by essentially ignoring all of the branch instructions except the final one in the vector run. For example, issue stage 212' may treat a branch instruction as a NOP unless the value of VC=VL-1.

In addition, when a branch instruction is taken in vector mode, a new vector iteration starts. As described above, a new value of RRB is loaded into register 405 from the output of multiplexer 405 at the start of each vector iteration. This function may be implemented by constructing processor 202 to load register 405 upon each execution of a branch instruction when the branch is taken.

Figure 6:
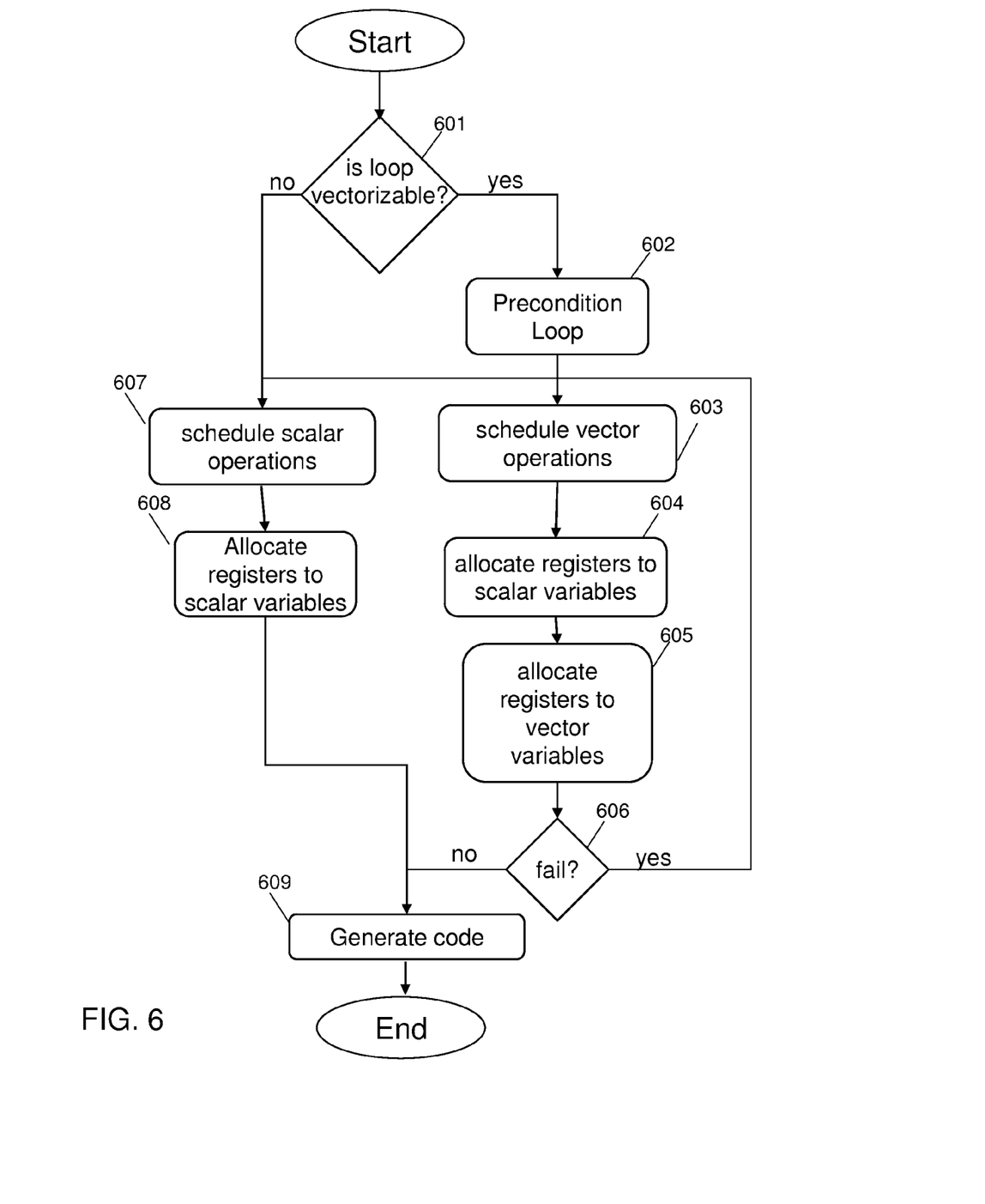
FIG. 6 is a flow chart of a process used in generating code to execute on a processor according to one embodiment of the invention.

Turning now to FIG. 6, a process for compiling a program to take advantage of vector mode execution is shown. The illustrated process may be performed at any suitable stage in the compilation process. It may run as part of a compile program on a computer work station used to develop code to be executed by a processor in the form of processor 202. In the described embodiment, the process of FIG. 6 is a back-end phase of the compiler. The embodiment shown in FIG. 6 indicates an opportunistic use of vector mode. If a loop is suitable for execution in vector mode, and sufficient registers are available for execution in vector mode, code is generated controlling the code to be executed in vector mode.

The process of FIG. 6 begins when the compiler identifies a loop in the program being compiled. At phase 601, a determination is made whether the loop is vectorizable. A loop is vectorizable when it may be executed in vector mode by the target processor for which the code in being compiled. In the described embodiment, a loop is vectorizable if:

The number of iterations of the loop is known before the loop is executed.

The loop is an inner loop, meaning that it does not contain loops embedded in it.

The loop contains no explicit control flow instructions, such as function calls, but there may be implicit, if converted, control flow.

There are no data flow recurrences where the lexically backward dependence distance is 1.

A "lexically backward dependence" refers to a data flow dependence where the instruction using the value appears before the instruction generating the value in the loop body code. The "dependence distance" refers to the number of loop iteration starts between an instruction that generates a value and an instruction that subsequently uses that value. If the value is generated and used in the same loop iteration, the dependence distance is 0. The distance is 1 if a value is generated at one iteration of the loop and used at the next. If there is a lexically backward dependence distance strictly greater than 1, the vector length may be limited to be less than that lexically backwards dependence distance to avoid creating a situation in which an instruction needs to access an operand that has not been defined. If there are multiple lexically backwards data dependences, the vector length should be set based on the smallest lexically backwards data dependence distance.

If the loop is vectorizable, processing proceeds to phase 602. At phase 602, the compiler generates instructions that precondition the loop. Preconditioning the loop involves generating the instructions that place processor 202 in vector mode. Here, a single instruction is used and may be in the form:

set_vector_mode ivl irub

This instruction has two operands, denoted here "ivl" and "irub." These operands represent values that are loaded into register 300 and register 360. The vector length and total number of registers needed to execute the loop in vector mode may be determined at subsequent stages in the compilation process. In the described embodiment, at the time phase 602 is executed, "ivl" and "irub" are not known and the compiler inserts delayed constants for these values. Actual values are substituted for the delayed constants when determined.

In addition, phase 602 inserts an instruction at the end of the loop to return the processor from vector mode. This instruction may be the same as used to enter vector mode, but with different operands. The instruction may be in the form:

set_vector_mode 1 0

In phase 602, instructions are re-ordered, if necessary, to ensure proper execution in vector mode. Definition of variables may be re-ordered to ensure that variables are defined before they are used. For each variable that is defined before the loop and used inside the loop, the definition must be "hoisted" above all its uses and assigned to a different variable, as illustrated in TABLE I.

TABLE I

| Scalar Code | | Code for Vector Execution | |
|---|---|---|---|
| I1 | Define V | I1' | Define V0 |
|  | Loop: |  | Loop: |
| I2 | Use V | I3' | Define V1 |
| I3 | Define V | I2' | Use V0 |
| I4 | Goto Loop | I4 | Goto Loop |

Table I shows an example of scalar code that could create improper operation if converted directly for execution in vector mode. In the scalar code, the value of V is defined at instruction I1. This defined value is used at I2 and the value of V is redefined at I3. In a subsequent iteration of the loop, the value of V defined at I3 in the prior iteration is used.

If the loop is converted to vector mode with the instructions in the same order as for the scalar code, each vector run of instruction I2 could potentially require at least as many values of the variable V as the vector length. However, at most one value is available prior to the time that instruction I3 is executed.

To avoid using variables before their values are generated, the definitions of the variables are scheduled before they are used. As part of the rescheduling, two variables—V0 and V1—are used in place of variable V. Instructions that define values for variables may be "hoisted" above instructions that use them. Table I shows that a variable V0 is defined at instruction I1' before the loop. Within the loop, a separate variable V1 is defined at instruction I3'. This definition occurs before any use of V0 in the loop. V0 and V1 are assigned to adjacent storage locations in the vector portion of the register file, so that when the register file rotates during the execution of I4, the new value of V0 becomes that of V1. An artificial dependence edge may be inserted between each variable definition and its corresponding uses in the scheduler dependence graph. Thereafter, scheduling may be performed as in a traditional compiler.

At phase 604, registers are allocated for scalar variables. Any variable that is not modified within the loop may be assigned to a register in scalar portion 350. In addition, variables that are used only within the same instruction may be assigned to a register within scalar portion 350.

All other variables are assigned to registers in the vector portion 352 at phase 605. The number of consecutive register locations that must be allotted in vector portion 352 depends on the manner in which the variable is referenced. Sufficient registers must be allocated such that the register holding the value computed for the variable in one iteration is not overwritten before the last time that value is accessed.

The number of sequential registers that must be allocated depends on the "dependence distance" of the variable. The number of register locations in the rotating portion of the register file that are allocated to a variable equals the vector length plus the dependence distance.

Allocating registers in this way allows an expression representing the total number of locations in the vector portion of the register file to be determined. This expression uses vector length as an unknown value, allowing the vector length to be computed by solving the equation. The expression will contain parameters for which numbered values may be determined. For example, the dependence distance of a variable depends on how it is used in a program. Numeric values for the dependence distances may be inserted into the equation.

The maximum size of the vector portion 352 is a function of the size of the register file 218 and the number of register locations allocated for scalar variable storage at the time the loop is to be executed. Both of these values can be known at the time the compiler performs phase 605.

The maximum possible vector length can be calculated by solving the expression for the vector length once numeric values of the other parameters in the expression are provided.

The value of the vector length is determined at phase 605. The specific numbers of registers in vector portion 352 that need to be allocated for each variable are then computed. At this phase, the values of "ivl" and "irub" may be determined and inserted in the loop preconditioning instructions.

At phase 606, a decision is made whether the loop may be implemented in vector mode. If the vector length computed at phase 605 is less than 2, insufficient space in the register file exists, causing the implementation in vector mode to fail. Vector mode implementation may also fail if there are "spills." A spill occurs when a processor needs to store a result and no unused register is available. The result is temporarily stored in a memory location outside the register file. In the described embodiment, a loop is not implemented in vector mode if there are any spills.

If implementation of the loop in vector mode fails, the process of FIG. 6 reverts to a traditional scalar implementation. Scalar implementation is also used where it is determined at phase 601 that the loop is not vectorizable. In scalar implementation, operations are scheduled at phase 607 and registers are allocated at phase 608. Phase 607 and 608 may be as in a traditional scalar mode compiler.

Once the operations are scheduled and the variables are allocated to registers, the process proceeds to phase 609. At phase 609, code executable by processor 202 is generated. Phase 609 may also be as in a prior art compiler.

Figure 7:
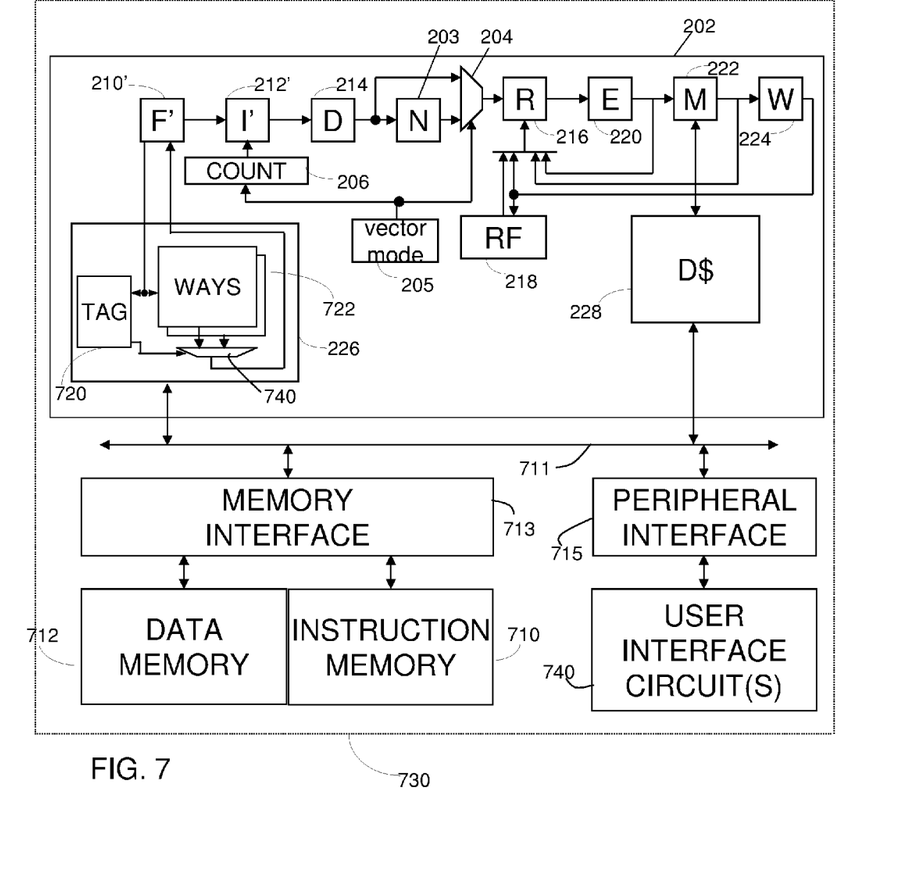
FIG. 7 is a block diagram illustrating application of a processor according to the invention in a hand-held electronic device.

Turning to FIG. 7, an application of processor 202 is illustrated. Processor 202 is used in a portable electronic device 730. Portable electronic device 730 may, for example, be a cell phone, a PDA or a hand held computer. Device 730 is here shown to have a user interface 740. User interface 740 may be a speaker, a keypad, a display screen and/or other user interface devices. Commands and data are provided to user interface circuits 740 through a peripheral interface circuit 715. Peripheral interface 715 is connected to other portions of device 730 over a bus 711.

Device 730 also includes instruction memory 710 and data memory 712. Instruction memory 710 and data memory 712 may be accessed by circuitry in processor 202 through memory interface circuit 713 and bus 711. Instruction and data locations are described by addresses in instruction memory 710 or data memory 712, respectively. Copies of some of the information in these memories are stored in instruction cache 226 and data cache 218. When a cache miss occurs in the instruction cache 226, instruction memory 710 is accessed. Likewise, when a cache miss occurs in data cache 228, data memory 712 is accessed.

Cache 226 is here shown to include a tag array 720 and multiple ways 722. The ways 722 contain storage locations that hold copies of the instructions stored in cache 226. The tag array 720 holds information indicating whether the instruction associated with a particular address in instruction memory 710 is copied in one of the ways 722. Thus, accessing the cache includes two operations. In one operation, the tag array 720 is accessed to determine whether the instruction at a particular address is stored in one of the ways. In the other operation, a way is read.

For faster cache access, these operations may be simultaneous. All way locations that could possibly store a needed instruction can be read at the same time that the tag array is read. Once the value is read from the tag array 720 to indicate which of the ways stores the desired instruction, multiplexer 740 selects the output of the way. With simultaneous access of the tag array and ways, there is little additional delay in providing the information from the cache once the tag array has been read.

The drawback of simultaneous access is that substantial power may be consumed. A value is read from every way for every read from instruction memory. Thus, power is wasted reading locations in the ways at which the instruction is not stored. Power is also wasted reading from each way even if a cache miss occurs.

A cache access may alternatively be sequential. For sequential access, the tag array is first read to determine whether a value is stored in the cache and, if so, in which way. Only the specific way holding the information is read. Sequential access is slower than simultaneous access of the tag array and the ways. However, sequential access consumes less power because fewer reads are made from the ways.

One benefit of executing instructions in vector mode is that the rate at which instructions must be fetched is at least half of the rate used in scalar mode to provide a comparable rate of instruction execution. The instruction fetch rate in inversely proportional to the vector length. As a result, longer time for sequential cache access is possible without impacting the performance of processor 505 and therefore device 730.

The same reasoning applies to data cache 228.

Caches 226 and 228 may be configured to always provide sequential access. Alternatively, caches 226 and 228 may be configured to provide sequential access in vector mode and simultaneous access when in scalar mode. As a result, fast execution and low power consumption is provided, which may be of a particular advantage in portable electronic device 730.

Further advantage is provided in that the number of "NOP" cycles is reduced in comparison to execution in scalar mode alone. NOP result from either long latency instructions, such as memory accesses, or as branch mispredictions, as illustrated in FIG. 1B. As shown in FIG. 1C, a "NOP" instruction is executed once for each vector iteration rather than once for each loop iteration. Reducing NOP's speeds execution of a program and therefore reduces the energy required to execute the program.

Having thus described several aspects of at least one embodiment of this invention, it is to be appreciated various alterations, modifications, and improvements will readily occur to those skilled in the art.

For example, it was described that when loops are executed a number of times that is not an integer multiple of the vector length, the loops are represented as one or more vector runs followed by one or more iterations of the loop in scalar mode. Alternatively, the vector length could be changed between vector runs so that the entire loop is executed in vector mode, albeit with vector runs of different vector length.

Also, some data is described as being stored in registers. While registers may be used because they have a fast access time, use of registers is not required. Information may be stored in any suitable memory structure.

As a further possible variation, rename stage 203 is pictured as a separate pipeline stage, meaning that its inputs are derived from the latched outputs of a prior pipeline stage and its outputs are latched for use by a subsequent pipeline stage in a later cycle. Alternatively, rename stage 203 may be incorporated within decode stage 214 or within circuitry of processor 202 at any suitable location. When rename stage 203 is incorporated into the decode stage 214, the output of multiplexer 204 produces one of the values latched at the output of decode stage 214. The choice of whether renaming occurs as part of a separate pipeline stage, as part of the decode stage 214 or in any other suitable manner is not critical to the invention. In designing a pipelined processor, it is often desirable to create stages having approximately equal processing delays. Accordingly, if decode stage 214 has a processing delay that is significantly shorter than other stages in the pipeline, the rename logic may be incorporated directly in decode stage 214. Conversely, if incorporating rename logic in decode stage 214 causes that stage to have a processing delay longer than other stages in the pipeline, the rename function may be implemented as a separate pipeline stage.

Further, it is not required that information shown stored in a register be stored in an independent register. A value may be stored as a field in a register that is segmented into multiple fields. For example, register 300, 301, 306 and 405 may be stored in separate fields in the same register, thereby reducing the total number of registers that need to be incorporated in a processor to operate in vector mode.

As another example, vector mode instructions are described as storing variables in a portion of a general purpose register file. This configuration is not required. Speed of execution may be increased by adding special purpose registers used only in vector mode. Instructions may be added to the processor instruction set to move data between the general purpose registers and the vector mode registers. As a further example, some processors are designed for simultaneous multi-threading. Such processors may have a general purpose register file associated with each thread. If one thread is not operating, its general purpose register file may be used for vector mode execution in the other thread.

As an example of another variation, FIG. 2B shows a counter 206 used to track the number of times an instruction is issued in a vector run. Likewise, rename stage 203 is shown to include registers 300 and 301 that are similarly used to track iterations of instructions within a vector run. The value in register 206 may be passed down the pipeline and that value may be used in place of the value in register 302.

Further, the back-end compilation process may be used with other compiler processes. For example, the illustrated back-end process may be used with a high-level loop transformation that recognizes sets of instructions that will be executed a fixed number of times, even if not expressly coded as a loop with a fixed number of iterations. Such sets of instructions may then be transformed into fixed length loops that may be subjected to processing as shown in FIG. 6.

Further, the described embodiment assumes that loop length is known at compile time. Processor 202 may be implemented with circuitry that dynamically computes the vector length, number of vector iterations and number of scalar iterations for any loop at execution time.

Such alterations, modifications, and improvements are intended to be part of this disclosure, and are intended to be within the spirit and scope of the invention. Accordingly, the foregoing description and drawings are by way of example only.

What is claimed is:

1. A processor comprising:
a) an instruction decode circuit having an address output, the instruction decode circuit being configured to determine an address specified by an instruction and to provide the specified address at the address output of the instruction decode circuit;
b) a rename circuit having 1) an address input coupled to the address output of the instruction decode circuit, and 2) an address output, the rename circuit comprising:
i) a counter configured to count a number of times the instruction decode circuit has consecutively decoded the instruction;
ii) an arithmetic circuit having 1) a first input coupled to the address input of the rename circuit, 2) a second input coupled to the counter, and 3) a renamed output, wherein the arithmetic circuit is configured to provide at the renamed output a renamed value representing:
the specified address received from the address output of the instruction decode circuit via the address input of the rename circuit,
added to a value stored in a first register, the value being indicative of a number of vector iterations that have been completed prior to a current vector run, and
offset by an amount that is based on a number of times the processor, while operating in a vector mode, has executed the instruction during the current vector run;
iii) a switching circuit having 1) a first input coupled to the address input of the rename circuit, 2) a second input coupled to the renamed output of the arithmetic circuit, 3) a control input, and 4) an output coupled to the address output of the rename circuit, wherein the switching circuit is configured to selectively couple a value at the first input of the switching circuit or the renamed value at the second input of the switching circuit to the output of the switching circuit based on a value of the control input; and c) a data access circuit having an address input coupled to the address output of the rename circuit.

2. The processor of claim 1, additionally comprising a plurality of output lines and instruction execution circuitry, the instruction execution circuitry controlling values on the plurality of output lines.

3. A portable electronic device comprising:
a) a processor according to claim 2;
b) a user interface having a data input coupled to the output lines of the processor.

4. The processor of claim 1, additionally comprising a register file having a plurality of storage locations each having an address associated therewith, wherein the data access circuit is configured to access a storage location in the register file at an address specified by a value at the address input of the data access circuit.

5. The processor of claim 4, wherein the register file comprises a predetermined number of locations and the arithmetic circuit is configured to provide the renamed value using modular arithmetic with a modulus less than the predetermined number of locations in the register file.

6. The processor of claim 5, additionally comprising an upper bound register storing a value representative of an address in the register file, wherein the arithmetic circuit is configured to provide the renamed value using modular arithmetic with a modulus equal to the value in the upper bound register.

7. The processor of claim 6, wherein the rename circuit additionally comprises control logic having 1) a first input coupled to the upper bound register, 2) a second input coupled to the address input of the rename circuit, and 3) an output coupled to the control input of the switching circuit.

8. The processor of claim 7, wherein the control logic is adapted to set a value on the output of the control logic in response to a relation between a value at the first input of the control logic and a value at the second input of the control logic.

9. The processor of claim 6, wherein:
a) the rename circuit additionally comprises a second counter and a vector length register holding a value, wherein the second counter is adapted to count in increments determined by the value in the vector length register;
b) the arithmetic circuit has a third input coupled to the second counter; and
c) the amount by which the specified address received at the first input of the arithmetic circuit is offset is proportional to the value at the second input of the arithmetic circuit and the value to which the specified address is added is based on a value at the third input of the arithmetic circuit.

10. The processor of claim 1, wherein the processor comprises at least a first pipeline stage and a second pipeline stage, wherein the decode circuit is within the first pipeline stage and the rename circuit is within the second pipeline stage.

11. A processor configured to execute a first instruction a consecutive plurality of times, the processor comprising:
a) instruction decode circuitry configured to determine an address specified by the first instruction;
b) rename circuitry configured to rename the specified address received from the instruction decode circuitry, wherein the rename circuitry is configured to rename the specified address based on:
a number of times the processor, while operating in a vector mode, has executed the first instruction during a current vector run, and
a number of vector iterations that have been completed prior to the current vector run;
c) instruction execute circuitry configured to execute the first instruction; and
d) write circuitry configured to write a result of executing the first instruction to the renamed address.

12. The processor of claim 11, further comprising fetch circuitry configured to stall fetching of a second instruction until after the first instruction has been issued the consecutive plurality of times.

13. The processor of claim 11, wherein the write circuitry is configured to write the result to a rotating register file.

14. The processor of claim 1, wherein:
the rename circuit is configured to update the value stored in the first register at a start of execution of each vector iteration in at least one loop.

15. The processor of claim 14, wherein:
the rename circuit is configured to, at a start of execution of a vector iteration other than a first vector iteration of the at least one loop, update the value stored in the first register based on a vector length.

16. The processor of claim 1, wherein the instruction is a first instruction, and wherein at least one of the vector iterations that have been completed prior to the current vector run comprises:
a prior vector run of the first instruction, and
an execution of a second instruction different from the first instruction.

* * * * *